US012618996B2

(12) United States Patent
McChesney et al.

(10) Patent No.: US 12,618,996 B2
(45) Date of Patent: May 5, 2026

(54) REAL-TIME CHARACTERIZATION OF FLUID FRONT IN SUBSURFACE FORMATION AND INFLOW MANAGEMENT

(71) Applicant: Halliburton Energy Services, Inc., Houston, TX (US)

(72) Inventors: Ryan W. McChesney, Carrollton, TX (US); Karl Ku, Houston, TX (US); Rex Dael Navarro, Singapore (SG); Daniel Thomas-Possee, Abingdon (GB)

(73) Assignee: Halliburton Energy Services, Inc., Houston, TX (US)

( * ) Notice: Subject to any disclaimer, the term of this patent is extended or adjusted under 35 U.S.C. 154(b) by 26 days.

(21) Appl. No.: 18/626,870

(22) Filed: Apr. 4, 2024

(65) Prior Publication Data
US 2025/0314794 A1 Oct. 9, 2025

(51) Int. Cl.
*G01V 1/50* (2006.01)
*E21B 49/00* (2006.01)

(52) U.S. Cl.
CPC .............. *G01V 1/50* (2013.01); *E21B 49/00* (2013.01); *G01V 2210/1299* (2013.01); *G01V 2210/16* (2013.01); *G01V 2210/646* (2013.01)

(58) Field of Classification Search
CPC ............. G01V 1/50; G01V 2210/1299; G01V 2210/16; G01V 2210/646; E21B 49/00
See application file for complete search history.

(56) References Cited

U.S. PATENT DOCUMENTS

| | | | |
|---|---|---|---|
| 10,120,093 | B2 | 11/2018 | Le Calvez et al. |
| 11,053,791 | B2 | 7/2021 | Langnes et al. |
| 11,098,576 | B2 | 8/2021 | Cerrahoglu et al. |
| 11,308,413 | B2 | 4/2022 | Shahkarami et al. |
| 11,326,443 | B2 | 5/2022 | Watanabe et al. |
| 11,466,563 | B2 | 10/2022 | Carrohoglu et al. |
| 11,473,424 | B2 | 10/2022 | Cerrahoglu et al. |
| 2002/0092701 | A1 | 7/2002 | Norris et al. |

(Continued)

OTHER PUBLICATIONS

"PCT Application No. PCT/US2024/023166 International Search Report and Written Opinion", Dec. 23, 2024, 13 pages.

*Primary Examiner* — Dany E Akakpo
(74) *Attorney, Agent, or Firm* — DeLizio, Peacock, Lewin & Guerra LLP

(57) ABSTRACT

Systems, methods, and apparatus, including computer programs encoded on computer-readable media, for performing a seismic survey and characterization of a subsurface formation. Seismic sources coupled to a wellbore of a well system may emit source seismic signals. Seismic sensors coupled to the wellbore may detect seismic signals associated with the plurality of source seismic signals. The detected seismic signals may be reflected seismic signals, refracted seismic signals, or both. A seismic characterization of the subsurface formation may be performed based on analysis of the detected seismic signals and the plurality of source seismic signals. A change in a fluid front of the subsurface formation may be detected based on the seismic characterization of the subsurface formation. Inflow control devices that control fluid flow in a plurality of zones of the wellbore may be controlled based on the seismic characterization and a detected change in the fluid front.

17 Claims, 5 Drawing Sheets

400

402 — EMIT A PLURALITY OF SOURCE SEISMIC SIGNALS FROM A PLURALITY OF SEISMIC SOURCES COUPLED TO A WELLBORE OF A WELL SYSTEM

404 — DETECT, BY A PLURALITY OF SEISMIC SENSORS COUPLED TO THE WELLBORE, SEISMIC SIGNALS ASSOCIATED WITH THE PLURALITY OF SOURCE SEISMIC SIGNALS, THE DETECTED SEISMIC SIGNALS BEING AT LEAST ONE OF REFLECTED SEISMIC SIGNALS OR REFRACTED SEISMIC SIGNALS

406 — PERFORM A SEISMIC CHARACTERIZATION OF THE SUBSURFACE FORMATION BASED ON ANALYSIS OF THE DETECTED SEISMIC SIGNALS AND THE PLURALITY OF SOURCE SEISMIC SIGNALS

(56)                    References Cited

U.S. PATENT DOCUMENTS

| 2013/0144532 | A1* | 6/2013 | Williams ............... G01V 1/301 |
| | | | 702/11 |
| 2014/0169131 | A1 | 6/2014 | Sinha |
| 2014/0372094 | A1 | 12/2014 | Holland et al. |
| 2018/0100938 | A1 | 4/2018 | Adamopoulos et al. |
| 2020/0102819 | A1 | 4/2020 | Watanabe et al. |

* cited by examiner

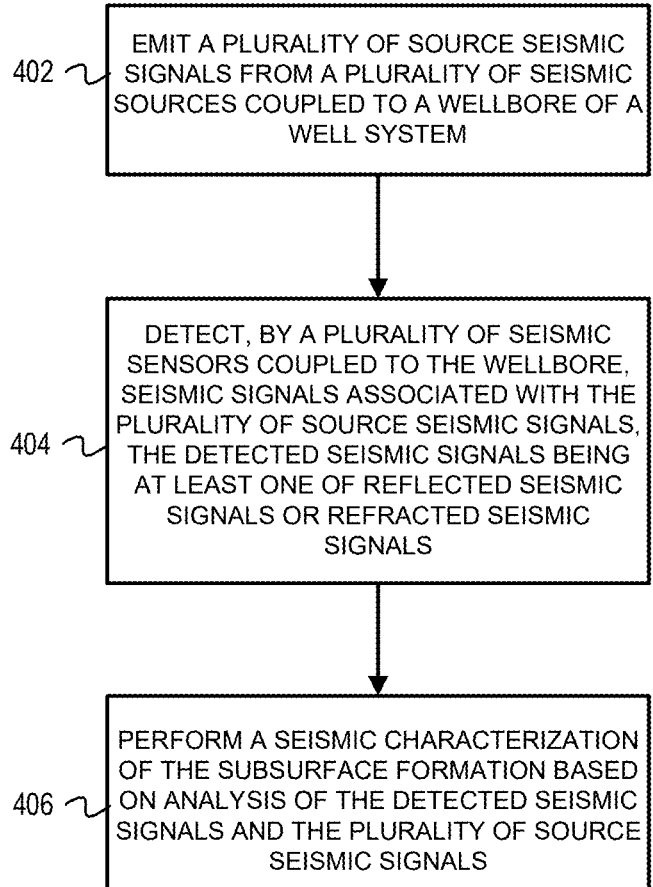

402 — EMIT A PLURALITY OF SOURCE SEISMIC SIGNALS FROM A PLURALITY OF SEISMIC SOURCES COUPLED TO A WELLBORE OF A WELL SYSTEM

404 — DETECT, BY A PLURALITY OF SEISMIC SENSORS COUPLED TO THE WELLBORE, SEISMIC SIGNALS ASSOCIATED WITH THE PLURALITY OF SOURCE SEISMIC SIGNALS, THE DETECTED SEISMIC SIGNALS BEING AT LEAST ONE OF REFLECTED SEISMIC SIGNALS OR REFRACTED SEISMIC SIGNALS

406 — PERFORM A SEISMIC CHARACTERIZATION OF THE SUBSURFACE FORMATION BASED ON ANALYSIS OF THE DETECTED SEISMIC SIGNALS AND THE PLURALITY OF SOURCE SEISMIC SIGNALS

FIG. 4

REAL-TIME CHARACTERIZATION OF FLUID FRONT IN SUBSURFACE FORMATION AND INFLOW MANAGEMENT

TECHNICAL FIELD

The present invention relates generally to oil and gas systems and services, and more specifically to real-time characterization of a fluid front of a subsurface formation and inflow management.

BACKGROUND

The oil and gas services industry typically performs seismic surveys to characterize the subsurface formation at well sites, including production and completion wells. Typically, the seismic surveys are performed from the surface, such as by using seismic vessels for ocean-based well sites and land seismic systems for land-based well sites. However, seismic surveys that are performed from the surface typically have low resolution and therefore it may be difficult to detect potential issues at targeted and localized areas of the formation and the wellbore. Furthermore, traditional wellbore monitoring techniques typically only detect the coning of the waterfront of the subsurface formation when the water contacts the wellbore. After the waterfront contacts the wellbore and there is a water breakthrough, water production can only be reduced using flow management techniques, but water production can no longer be prevented. Allowing water breakthrough to occur may result in increased sand production and capital cost to process brine at the surface. Brine can short circuit packers in the different zones of the wellbore and cut off oil production, which reduces total oil recovery. Thus, water breakthroughs typically reduce the life of the well since one or more of the zones of the wellbore become compromised by the water breakthrough, and eventually most or all of the zones of the wellbore can be affected, where the well is mainly producing water.

BRIEF DESCRIPTION OF THE DRAWINGS

FIG. 4 is a flowchart of example operations for performing a seismic survey and characterization of the subsurface formation to monitor a fluid front of the subsurface formation, according to some implementations.

DESCRIPTION

The description that follows includes example systems, methods, techniques, and program flows that describe aspects of the disclosure. However, it is understood that this disclosure may be practiced without these specific details. For instance, this disclosure refers to certain well systems, devices, or tools in illustrative examples. Aspects of this disclosure can be instead applied to other types of well systems, devices, and tools. In other instances, well-known instruction instances, protocols, structures, and techniques have not been shown in detail to avoid confusion.

Figure 1:
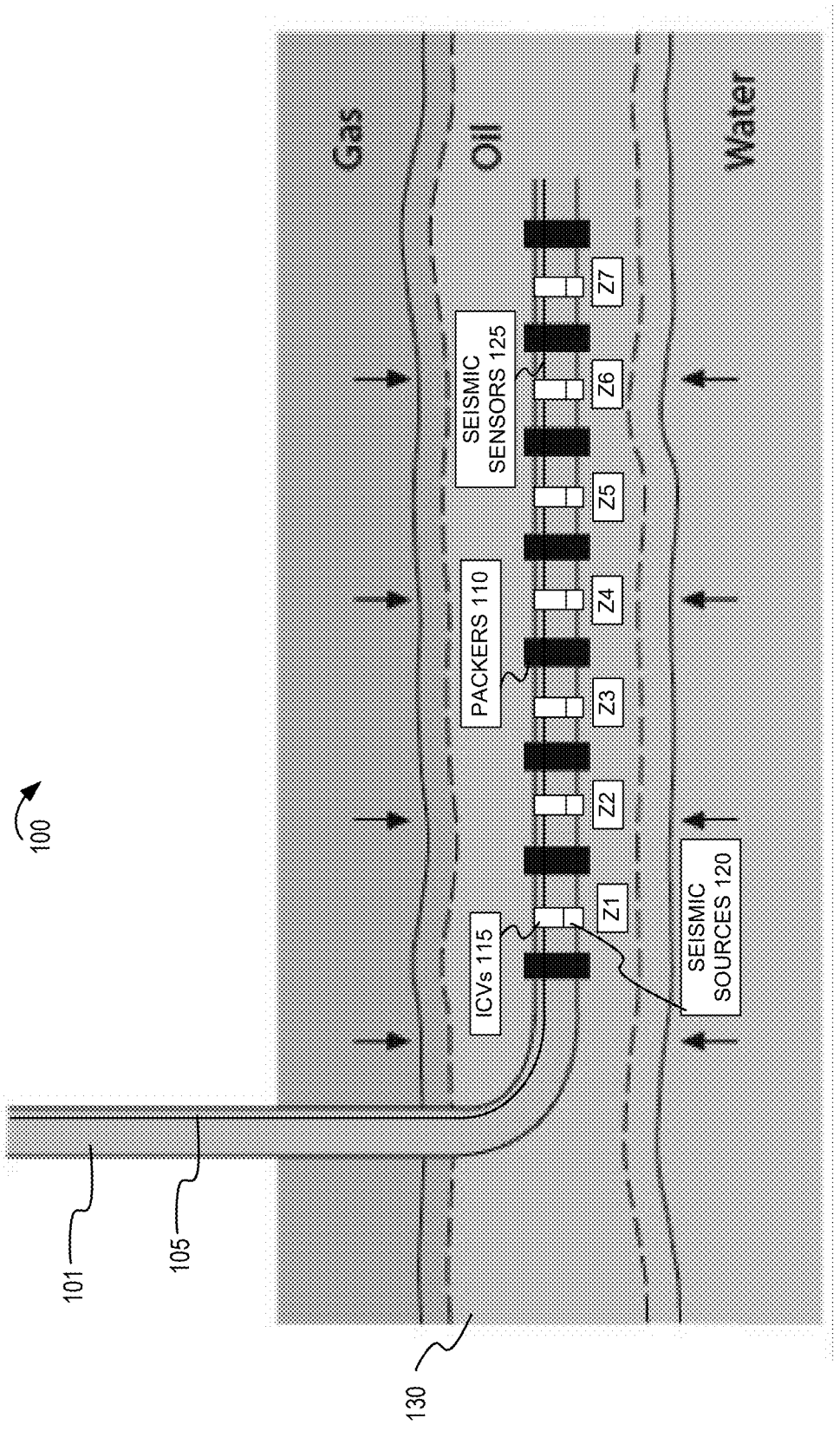
FIG. 1 depicts a schematic diagram of an example well system including an array of seismic sources and an array of seismic sensors positioned downhole and coupled to the wellbore of the well system, according to some implementations.

FIG. 1 depicts a schematic diagram of an example well system 100 including an array of seismic sources and an array of seismic sensors positioned downhole and coupled to the wellbore of the well system 100, according to some implementations. In some implementations, the well system 100 may include a wellbore 101, well lines 105, zonal isolation packers 110, inflow control valves (ICVs) 115, seismic sources 120, and seismic sensors 125. The well system 100 shown in FIG. 1 may also include additional components and devices that are not shown for simplicity. In some implementations, the well lines 105 may include one or more electrical lines, one or more fiber optic lines, or both electrical and fiber optic lines. In some implementations, the seismic sensors 125 may be implemented using the one or more fiber optic lines, as further described below. In some implementations, the seismic sensors 125 may be implemented using geophones, hydrophones, or any other type of device that can sense seismic or acoustic waves or signals. In some implementations, the seismic sources 120 may be implemented using piezoelectric devices or any other type of device that can transmit a seismic or acoustic wave or signal. In some implementations, the seismic sources 120 and the seismic sensors 125 may be coupled to the wellbore 101 in the horizontal portion of the wellbore 101, as shown in FIG. 1. It is noted, however, that in other implementations the seismic sources 120 and the seismic sensors 125 may be coupled downhole to any portion or multiple portions of the wellbore 101. In some implementations, the seismic sources 120 and/or the seismic sensors 125 may be oriented downhole during a run in hole (RIH) process of the tubing, piping and/or casing of the wellbore 101 to perform the downhole transmission and sensing operations described herein. In some implementations, the seismic sources 120 and/or the seismic sensors 125 may self-orient in the downhole direction to perform the downhole transmission and sensing operations described herein. For example, the seismic sources 120 and/or the seismic sensors 125 may be manually positioned downhole and/or may be self-oriented downhole to know the position of the sources and/or sensors when performing the downhole transmission and sensing operations described herein. In some implementations, the zonal isolation packers 110 may create multiple zones in the wellbore 101 for oil and gas extraction from the subsurface formation 130. For example, the wellbore 101 may include seven zones, such as zone 1 (Z1), zone 2 (Z2), zone 3 (Z3), zone 4 (Z4), zone 5 (z5), zone 6 (Z6), and zone 7 (Z7). In some implementations, the fluid flow (e.g., such as the oil flow) through the zones may be controlled by the corresponding ICVs 115, as further described below. The subsurface formation 130 may include multiple layers or reservoirs, such as a gas layer or reservoir, an oil layer or reservoir, and a water layer or reservoir. As shown in FIG. 1, the gas layer typically has a gas front that may come in contact with the oil layer and divides the two layers or reservoirs, and the water layer has a waterfront that may come in contact with the oil layer and divides the two layers or reservoirs.

In some implementations, the seismic sources 120 (which may also be referred to as seismic transmitters, acoustic sources or acoustic transmitters, among others) and the seismic sensors 125 (which may also be referred to as seismic receivers, acoustic sensors, or acoustic receivers, among others) may be used to perform a seismic survey to characterize the subsurface formation and monitor one or more fluid fronts (such as a waterfront, a gas front, or both) of the subsurface formation in real-tie. In some implementations, when performing the seismic survey, the well system 100 may utilize in-situ time-lapse imaging to characterize fluid fronts of the subsurface formation in real-time. The well system 100 may monitor the one or more fluid fronts in real-time to detect when the fluid begins to approach the wellbore 101. For example, the well system 100 may monitor the waterfront to detect when the water begins coning and approaching one or more of the zones of the wellbore 101. By detecting when the fluid front begins approaching one or more of the zones of the wellbore 101, the well system 100 may prevent water from contacting the wellbore 101 and prevent water breakthrough. Monitoring the waterfront using the techniques described herein may prevent water production from replacing part of the oil production, prevent one or more of the zones from becoming compromised by water breakthrough, and maintain the production life of the well.

In some implementations, the well system 110 may use the seismic sources 120 and the seismic sensors 125 to determine a baseline seismic characterization of the subsurface formation. For example, prior to extraction of hydrocarbons (e.g., oil and/or gas), the well system 110 may determine the baseline seismic characterization. During hydrocarbon extraction operations, the well system 100 may use the seismic sources 120 (which may be referred to as an array of seismic sources) and the seismic sensors 125 (which may be referred to as an array of seismic sensors) to obtain additional and updated seismic characterizations of the subsurface formation. The well system 100 may monitor the fluid fronts of the subsurface formation by comparing the additional characterizations of the subsurface formation to the baseline characterization, as further described below. In some implementations, the seismic sources 120 may emit or transmit seismic source signals (which may be referred to as seismic waves, acoustic signals, or acoustic waves) that reflect off of, or are refracted along, the fluid front, such as the waterfront, in the subsurface formation. The reflected and/or refracted seismic signals can be detected or sensed by the seismic sensors 125. For example, when the fiber optic line is used to implement the seismic sensors 125, the reflected seismic signals can be detected at various points in the fiber optic line. The seismic sensors 125 can provide the data associated with the sensed reflected and/or refracted seismic signals to the surface for analysis. The sensed data received at the surface during the baseline seismic survey and characterization can be processed and stored for reference and comparison with the sensed data from subsequent surveys. The sensed data received during each of the additional seismic surveys and characterizations can be analyzed using one or more algorithms that compare various properties of the sensed reflected and/or refracted seismic signals with the properties of the seismic source signals to determine whether the fluid front of the subsurface formation has changed, as further described below in FIGS. 2-3. For example, the analysis may determine whether the waterfront of the subsurface formation shown in FIG. 1 has changed and whether the waterfront is approaching or coning towards one or more of the zones. In some implementations, when the sensed data is processed and characterized, seismic imaging can be generated that can show whether the fluid front has changed and is approaching one or more zones of the wellbore 101. If the fluid front has changed, the well system 100 may determine whether the change is significant enough to indicate the fluid front is approaching or coning towards one or more of the zones. For example, the well system 100 may determine that the change is significant if the change in the waterfront (i.e., the movement of the waterfront towards the wellbore 101) is greater than a threshold. The threshold may be a percentage move in the waterfront, a delta move in distance by the waterfront, such as in feet or meters, or any other measure of a change in the waterfront.

In some implementations, if the change in the fluid front is significant enough to indicate the fluid front is approaching or coning towards one or more of the zones, the well system 100 may autonomously perform mitigating actions to stop the coning, or the well system 100 may provide a notification or alert to the well operator to manually perform mitigating actions to stop the coning. In some implementations, the well system 100 may trigger one or more of the ICVs of the corresponding one or more zones to modify the fluid flow. For example, if the characterization and analysis of the sensed data indicates that the coning of the waterfront is taking place in Z6, the ICV 115 in Z6 can modify the fluid flow (e.g., the oil extraction flow or production rate) to stop the coning of the waterfront. For example, the fluid flow in Z6 may be temporarily stopped, reduced, or throttled on and off at a certain rate to stop the coning. The well system 100 may also trigger other ICVs 115 in other zones to modify the fluid flow (e.g., the oil extraction flow or production rate), such as increasing the fluid flow in the other zones. Increasing oil extraction flow or production rate in the other zones may help maintain a uniform fluid front, disperse and reduce or eliminate the coning in Z6, and increase total recovery. Additional details and examples regarding the techniques described herein for monitoring and mitigating changes in the fluid front of the subsurface formation are described below in FIGS. 2-4.

Figure 2:
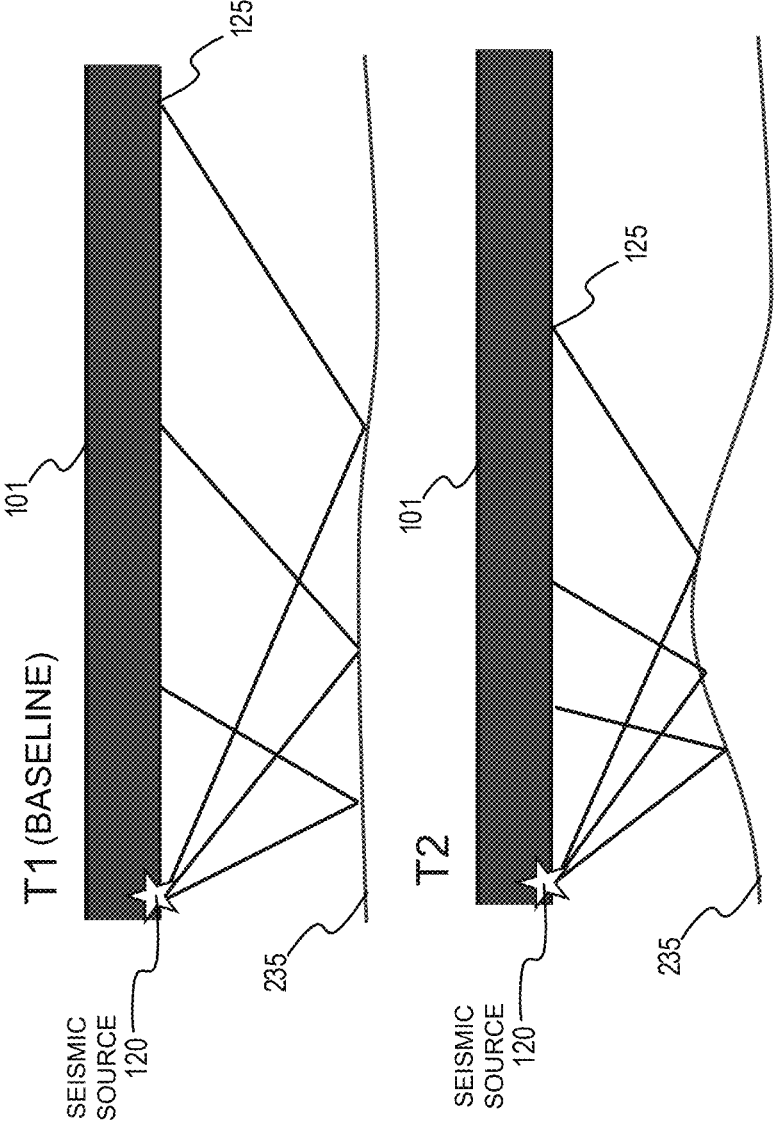
FIG. 2 depicts a schematic diagram of an example process for performing a seismic survey and characterization of the subsurface formation to monitor a fluid front of a subsurface formation, according to some implementations.

FIG. 2 depicts a schematic diagram of an example process for performing a seismic survey and characterization of the subsurface formation to monitor a fluid front of a subsurface formation, according to some implementations. In the example shown in FIG. 2, during the baseline seismic survey and characterization performed at time T1, one or more seismic sources 120 coupled to the wellbore 101 are actuated by the well system to emit or transmit multiple seismic source signals in the direction of the fluid front of the subsurface formation, such as the waterfront 235 of the subsurface formation. The seismic source signals reflect off the waterfront 235, and the reflected seismic signals can be detected or sensed by one or more of the seismic sensors 125 that are coupled to the wellbore 101. In the example shown in FIG. 2, three reflected seismic signals are sensed by at least three seismic sensors 125 located in three different parts of the wellbore 101. In one example, the reflected seismic signals can be detected by three different points on a fiber optic line having seismic sensing capabilities. During the baseline seismic survey and characterization, the seismic sensors 125 can transmit sensed data associated with the sensed signals to the surface to be processed and stored for reference and comparison with the sensed data from subsequent surveys, as further described in FIG. 3. In the example shown in FIG. 2, during a subsequent (or updated) seismic survey and characterization of the subsurface formation during time T2, the one or more seismic sources 120 are again actuated by the well system to emit or transmit multiple seismic source signals in the direction of the waterfront 235. The seismic source signals reflect off of the waterfront 235, and the reflected seismic signals can be detected or sensed by one or more of the seismic sensors 125. As shown in FIG. 2, during time T2, the waterfront 235 has begun to approach the wellbore 101 (e.g., initial stages of coning), and thus the reflected seismic signals are reflected in a different pattern as compared to the baseline seismic survey and the reflected seismic signals exhibit different properties and characteristics compared to the reflected seismic signals in the baseline.

The sensed data derived from various properties of the reflected seismic signals at T2 can be compared with the sensed data from the baseline seismic characterization to determine whether the fluid front has moved. In some implementations, a combination of properties indicated by the sensed data from the baseline characterization at T1 and from the subsequent or updated characterization can be compared to determine whether there is coning of the waterfront. For example, the travel time, phase, and amplitude of the reflected seismic signals at T1 can be compared to the travel time, phase, and amplitude of the reflected seismic signals at T2. As another example, a comparison of which seismic sensors 125 received the reflected seismic signals at T1 and the reflected seismic signals at T2 can be used to determine which zone is closest to the beginning stages of the coning of the waterfront. It is noted, however, that various other properties or characteristics of the seismic signals can be analyzed and compared to monitor the movements of the waterfront of the subsurface formation. In some implementations, the various properties and characteristics of the seismic signals can be used to visualize the changes in the subsurface formation, including the changes in the fluid fronts, by generating time lapse images of the subsurface formation. For example, a baseline seismic image generated from characterizing the sensed data obtained during the baseline survey can be compared to a seismic image generated from characterizing the sensed data obtained during an additional or updated seismic survey. Since the sensed data is obtained from seismic sensors that are located downhole and coupled to the wellbore 101, the time lapse images generated from the seismic survey and characterization can be of high spatial and temporal resolution, and the process can be continuously repeated as needed to provide real-time monitoring of the fluid fronts. The real-time and dynamic subsurface formation modeling and imaging can trigger inflow management techniques to prevent the coning of the waterfront and prevent water breakthrough in the wellbore 101.

Figure 3:
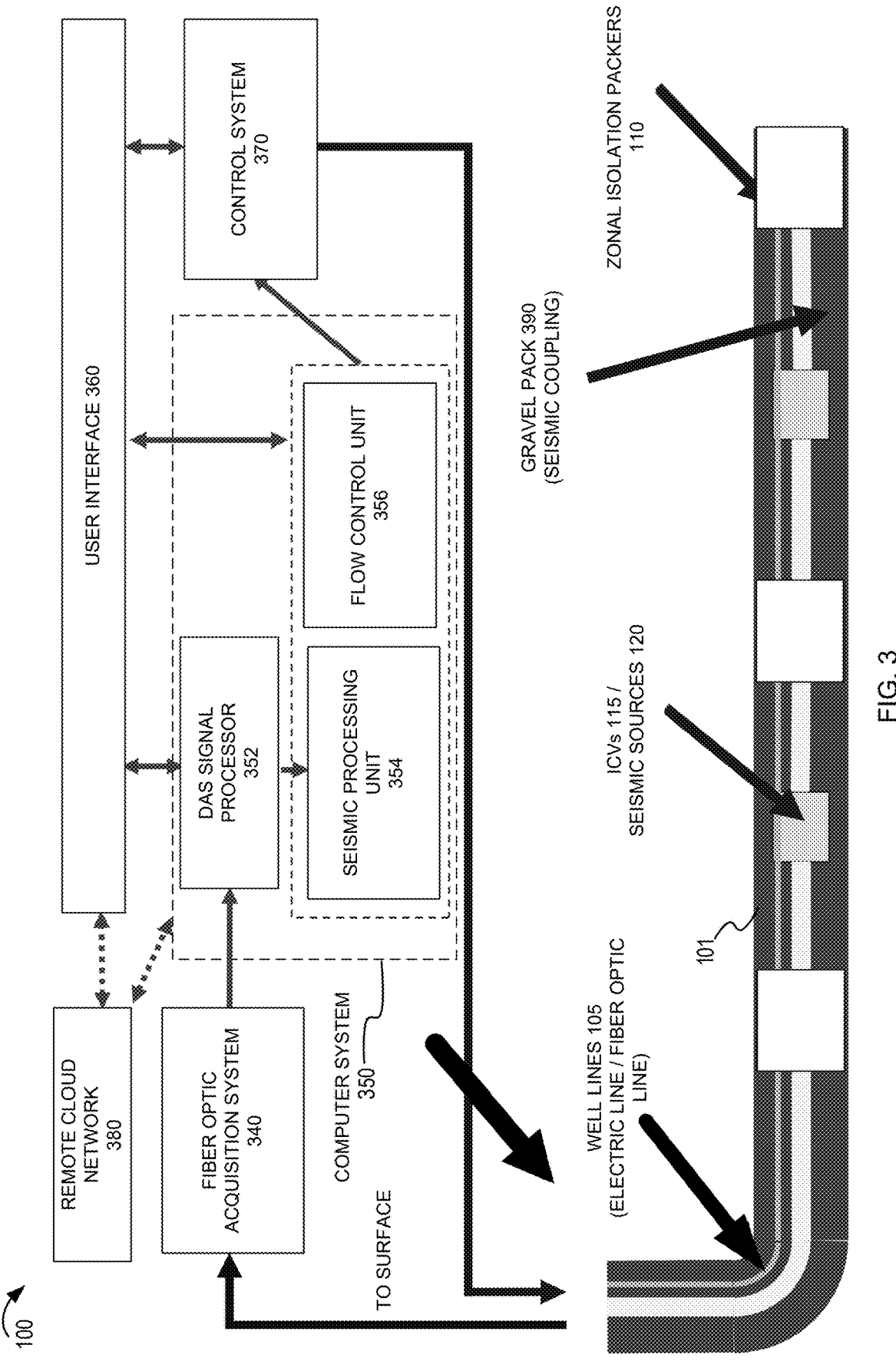
FIG. 3 depicts a schematic diagram of an example well system configured to perform a seismic survey and characterization of the subsurface formation to monitor the fluid front of the subsurface formation, according to some implementations.

FIG. 3 depicts a schematic diagram of an example well system 100 configured to perform a seismic survey and characterization of the subsurface formation to monitor the fluid front of the subsurface formation, according to some implementations. In some implementations, at the surface, the well system 100 may include a fiber optic acquisition system 340, a computer system 350, a user interface 360, a control system 370, and a remote cloud network 380. The computer system 350 may include a distributed acoustic sensing (DAS) signal processor 352, a seismic processing unit 354, and a flow control unit 356. In some implementations, one or more of the fiber optic acquisition system 340, the user interface 360, and the control system 370 can be integrated as part of, or implemented by, the computer system 350. The downhole portion of the well system 100 may include the wellbore 101, the well lines 105, the ICVs 115, the seismic sources 120, the zonal isolation packers 110, and gravel pack 390. The well lines 105 may include one or more electrical lines and one or more fiber optic lines.

In the example shown in FIG. 3, the seismic sensors can be implemented using the fiber optic line, as further described below. The zonal isolation packers 110 may divide the wellbore 101 into multiple zones for flow management and oil extraction.

As described in FIG. 2, the seismic sources 120 are configured to emit seismic signal to perform the seismic survey and characterization of the subsurface formation. In some implementations, the control system 370 may trigger the seismic sources 120 via the electrical line to emit the seismic signals. For example, the control system 370 may transmit signals via the electrical line to actuate the seismic sources 120 to emit the seismic signals. The control system 370 may autonomously trigger the seismic sources 120 continuously, periodically according to a schedule, or the control system 370 may allow the seismic sources 120 to be triggered manually by the well operator. For example, the well operator can manually trigger the seismic devices and perform other system configurations and control functions via the user interface 360. In some implementations, the fiber optic line may be used to detect the seismic signals. For example, the fiber optic line may use distributed acoustic sensing (DAS) to implement seismic sensors at any or various points along the fiber optic line (which may be referred to as virtual seismic sensors). As described in FIG. 1, in other implementations the seismic sensors may be implemented using other mechanisms or devices, such as geophones or hydrophones, among others. In some implementations, seismic sources and the seismic sensors that are coupled to the wellbore 101 may also be coupled to the formation via a seismic coupling that allows seismic signals to be transmitted and sensed from the formation. For example, the seismic sources and the seismic sensors may be coupled to the formation via the gravel pack 390. The gravel pack 390 may provide an optimal seismic coupling to the subsurface formation to perform the seismic survey and characterizations. After detecting the seismic source signals during the baseline seismic survey and characterization, and detecting the reflected and/or refracted seismic signals during subsequent (or updated) seismic surveys and characterizations, the sensed data associated with the seismic signals can be transmitted to the surface. For example, the sensed data can be transmitted to the surface using the fiber optic line. In some implementations, the sensed data may be received by the fiber optic acquisition system 340 and provided to the DAS signal processor 352. For example, the sensed data may be provided to the DAS signal processor 352 of the computer system 350 for processing and characterization of the sensed data.

In some implementations, after processing and characterizing the sensed data, the characterized data can be further processed using one or more algorithms. For example, the computer system 350 may implement one or more algorithms in the seismic processing unit 354 to process and compare all the properties and characteristics of the sensed seismic signals. The seismic processing unit 354 may compare the properties and characteristics of the sensed data from the baseline seismic survey and characterization to properties and characteristics of the sensed data from subsequent seismic surveys and characterizations of the subsurface formation. As described in FIG. 2, the properties may include the travel time, phase, and amplitude of the seismic signals, among others, and the characteristics may include which seismic sensors detected the reflected seismic signals and the pattern of the reflected signals, among others. The comparison of the properties and characteristics of the sensed signals from the baseline and the subsequent surveys can indicate whether the waterfront of the subsurface formation has changed and is approaching one or more zones of the wellbore 101 (e.g., such as the beginning stages of the coning of the waterfront). In some implementations, the seismic processing unit 354 may also generate a baseline seismic image and one or more updated seismic images, and compare the seismic images to monitor the waterfront of the subsurface formation. If the waterfront has changed, the seismic processing unit 354 may determine whether the change is significant enough to indicate the waterfront is approaching or coning towards one or more of the zones of the wellbore 101. For example, the seismic processing unit 354 may determine that the change is significant if the change in the waterfront (i.e., the movement of the waterfront towards the wellbore 101) is greater than a threshold. The threshold may be a percentage move in the waterfront, a delta move in distance by the waterfront, such as in feet or meters, or any other measure of a change in the waterfront.

In some implementations, if the change in the waterfront is greater than the threshold (e.g., which may indicate the waterfront is approaching or coning towards one or more of the zones of the wellbore 101), one or more algorithms that are implemented in the flow control unit 356 may autonomously determine and perform mitigating actions to stop the waterfront from coning and from approaching the wellbore 101 to prevent water breakthrough. For example, the seismic processing unit 354 may provide the comparison and processing results to the flow control unit 356, and the flow control unit 356 may determine what mitigating actions to autonomously perform. As another example, the flow control unit 356 may provide a notification or alert to the well operator to manually perform mitigating actions for flow control (e.g., via the user interface 360). In some implementations, the flow control unit 356 may provide control signals to the control system 370 that is used to manage and control the ICVs 115 of the wellbore 101. The control system 370 can trigger one or more of the ICVs 115 of one or more zones of the wellbore 101 to modify the fluid flow in one or more of the zones. For example, if the analysis of the sensed data indicates that the coning of the waterfront is taking place in a first zone, the control system 370 can cause the ICV 115 in the first zone to modify the fluid flow (e.g., the oil extraction flow or production rate) in order to stop the coning of the waterfront. For example, the fluid flow in the first zone may be temporarily stopped, reduced, or throttled on and off at a certain rate to stop the coning of the waterfront. The control system 370 may also trigger other ICVs 115 in other zones to modify the fluid flow (e.g., the oil extraction flow or production rate), such as increasing the fluid flow in the other zones, to help maintain a uniform fluid front, disperse and reduce or eliminate the coning in the first zone, and increase total recovery. The specific amounts that the fluid flow is modified in the zones may vary depending on the analysis and processing that is performed by the one or more algorithms in the seismic processing unit 354 and the flow control unit 356. For example, if it is determined that the waterfront coning is progressing at a fast rate, the fluid flow via the ICV 115 at the first zone may be temporarily stopped and the fluid flow via one or more ICVs 115 in one or more other zones may be significantly increased to maintain oil production, while at the same time preventing the waterfront from approaching the wellbore 101. As another example, if it is determined the waterfront coning is progressing slowly, the fluid flow via the ICV 115 in the first zone may be slightly reduced or throttled, and the fluid flow in other zones may be minimally increased. It is noted, however, that various other flow control techniques can be implemented to stop the waterfront coning in addition to the examples described above.

In some implementations, the well system 100 may provide historical results and records from the fluid front monitoring and inflow management techniques described herein to a remote cloud network 380. Although FIGS. 1-3 describe a single well system performing the fluid front monitoring and inflow management techniques, multiple well systems at a well site or across multiple well sites can implement the techniques described here. The aggregate historical results and records from multiple well systems can be provided to the remote cloud network 380 for further analysis, for improvement of the algorithms, for training purposes, and for record keeping. Furthermore, although the example well systems shown in FIGS. 1-3 show production and completion well systems, it is noted that the techniques described herein can be applied to various types of well system. In some implementations, the techniques described herein may be adapted and applied to other applications outside of the oil and gas applications. For example, the operations described herein may be applied to image carbon capture and storage (CCS) projects to manage injection flow and/or to monitor temperatures in geothermal applications. As another example, the techniques described herein may be deployed to manage lithium concentration gradients while extracting lithium rich brines or monitor molecular hydrogen ($H_2$) formation reactions in an enhanced geological $H_2$ extraction well.

FIG. 4 is a flowchart 400 of example operations for performing a seismic survey and characterization of the subsurface formation to monitor a fluid front of the subsurface formation, according to some implementations. In some implementations, a plurality of source seismic signals are emitted from a plurality of seismic sources coupled to a wellbore of a well system (block 402). In some implementations, seismic signals associated with the plurality of source seismic signals are detected by a plurality of seismic sensors coupled to the wellbore of the well system (block 404). The detected seismic signals may be at least one of reflected signals or refracted signals. For example, the detected signals may be only reflected signals, only refracted signals, or both reflected and refracted signals. In some implementations, a seismic characterization of the subsurface formation is performed based on analysis of the detected seismic signals and the plurality of source seismic signals (block 406). In some implementations, it is determined whether to perform one or more well system operations on the wellbore based on the seismic characterization of the subsurface formation. In some implementations, the well system operations may include controlling inflow control devices that control fluid flow in a plurality of zones of the wellbore based on the seismic characterization of the subsurface formation.

In some implementations, performing the seismic characterization of the subsurface formation based on the analysis of the detected seismic signals and the plurality of source seismic signals includes detecting a change in a fluid front of the subsurface formation based on the seismic characterization of the subsurface formation. In some implementations, detecting the change in the fluid front of the subsurface formation based on the seismic characterization of the subsurface formation includes performing a baseline seismic characterization of the subsurface formation, performing one or more additional seismic characterizations of the subsurface formation, and detecting the change in the fluid front of the subsurface formation based on a comparison of the baseline seismic characterization and the one or more additional seismic characterizations. In some implementations, performing the seismic characterization of the subsurface formation based on the analysis of the detected seismic signals and the plurality of source seismic signals includes deriving a baseline seismic image of the subsurface formation including a fluid front of the subsurface formation based on a baseline seismic characterization of the subsurface formation, deriving one or more additional seismic images of the subsurface formation including the fluid front of the subsurface formation based on one or more additional seismic characterizations of the subsurface formation, and detecting a change in the fluid front of the subsurface formation based on a comparison of the baseline seismic image and the one or more additional seismic images of the subsurface formation.

In some implementations, the operations further include detecting a change in a fluid front of the subsurface formation based on the seismic characterization of the subsurface formation, and controlling inflow control devices that control fluid flow in a plurality of zones of the wellbore prior to the fluid front making contact with the wellbore in response to detecting the change in the fluid front of the subsurface formation. In some implementations, determining that the change in the fluid front of the substrate formation is a fluid front change that affects a first zone of the plurality of zones of the wellbore, determining the change in the fluid front is greater than a threshold, and controlling the inflow control devices that control the fluid flow in the first zone and in one or more additional zones of the wellbore in response to determining the change in the fluid front is greater than the threshold. In some implementations, controlling the inflow control devices that control the fluid flow in the first zone includes one of turning off the fluid flow, reducing the fluid flow, or throttling the fluid flow in the first zone prior to the fluid front of the substrate formation contacting the wellbore, and controlling the inflow control devices that control the fluid flow in the one or more additional zones includes increasing the fluid flow in the one or more additional zones prior to the fluid front of the substrate formation contacting the wellbore.

Figure 5:
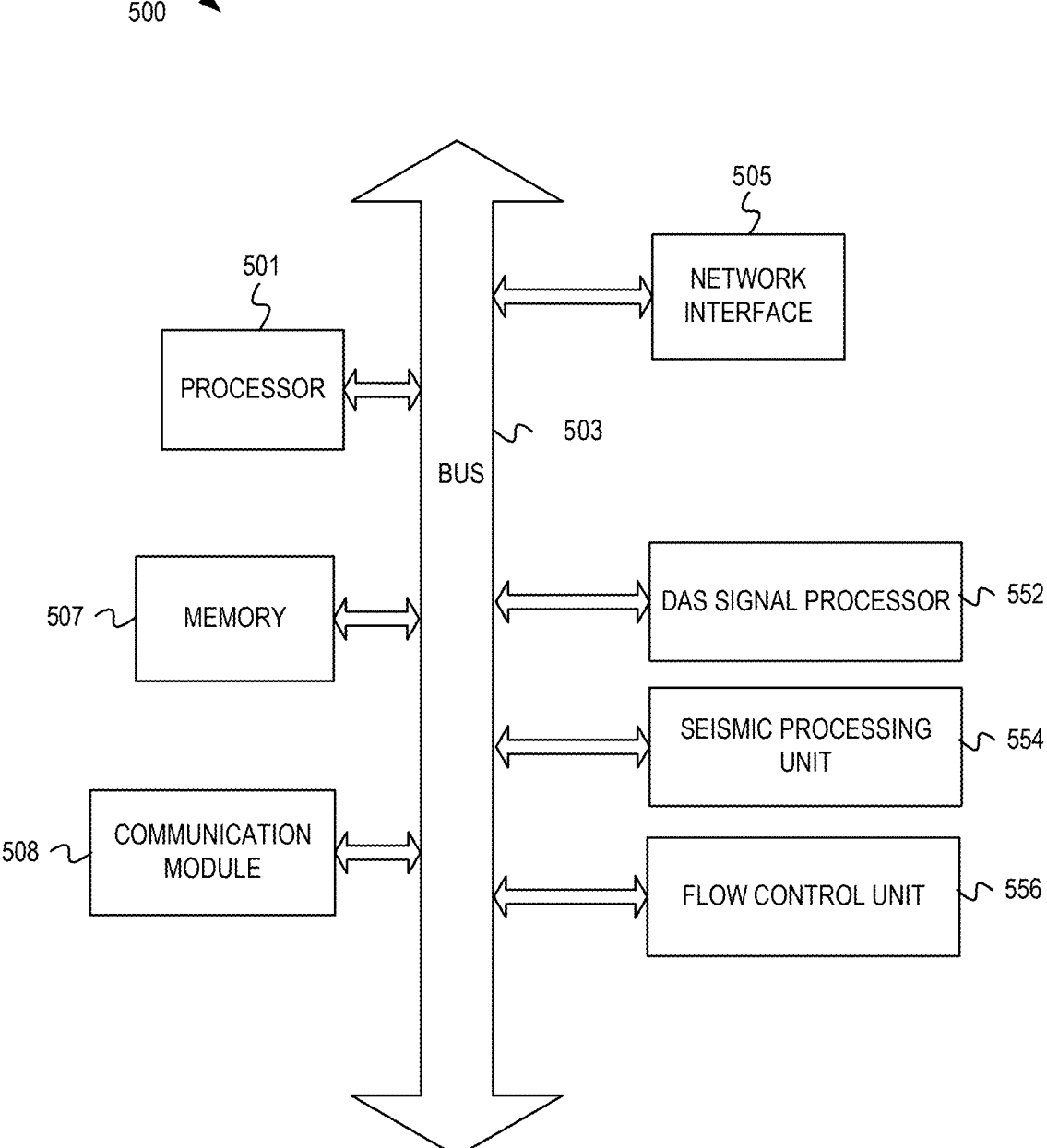
FIG. 5 depicts an example computer system that can be implemented in surface equipment of a well system for performing seismic surveys for monitoring fluid fronts and performing inflow management.

FIG. 5 depicts an example computer system that can be implemented in surface equipment of a well system for performing seismic surveys for monitoring fluid fronts and performing inflow management. The computer system 500 may be an example of a computer system that may be used during the operation of the well system, such as the computer system 350 shown in FIG. 3. For example, the computer system 500 may be a standalone computer system (such as a workstation, laptop, or desktop) or may be integrated into other surface equipment of the well system. The computer system 500 may include one or more processors 501 (possibly including multiple cores, multiple nodes, and/or implementing multi-threading, etc.). The computer system 500 may include memory 507. The memory 507 may be system memory or any type or implementation of machine or computer readable media having instructions that are executable by the one or more processors 501 to implement the operations described in FIGS. 1-4. The memory 507 may be system memory or any type or implementation of machine or computer readable and writable media having the ability to receive, process and/or store data from well devices and tools (including those described in FIGS. 1-4). The computer system 500 also may include a bus 503 and a network interface 505. The computer system 500 also may include a communications module 508 that may control wired and wireless communications, such as communicating with downhole devices or tools and communicating with other surface equipment. The computer system 500 also may include at least a DAS signal processor 552, a seismic processing unit 554, and a flow control unit 556, among other processing units or modules that are used during the operation of the well system and the well tools described herein. For example, the DAS signal processor 552 may process and characterize sensed data received from the seismic sensors, as described in FIGS. 1-3. The seismic processing unit 554 may implement one or more algorithms to further process and analysis the sensed data and compare the updated seismic survey results with the baseline survey results to determine whether a fluid front (such as a water-front) of the subsurface formation is approaching the wellbore, as described above in FIGS. 1-3. In some implementations, the flow control unit 556 may work in conjunction with the seismic processing unit 554 and implement one or more algorithms to manage inflow control devices at the wellbore to prevent the fluid front of the subsurface formation from making contact with the wellbore and maintain the production life of the well. The functionality described herein may be implemented with an application-specific integrated circuit, in logic implemented in the processor(s) 501, in a co-processor on a peripheral device or card, etc. Further, implementations may include fewer or additional components not illustrated in FIG. 5. The processor(s) 501 and the network interface 505 may be coupled to the bus 503. Although illustrated as being coupled to the bus 503, the memory 507 may be coupled to the processor(s) 501.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, includ-ing but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® program-ming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for monitoring fluid fronts and performing inflow management as described herein may be implemented with facilities consistent with any hardware system or hardware systems. Many variations, modifications, additions, and improvements are possible.

Plural instances may be provided for components, opera-tions or structures described herein as a single instance. Finally, boundaries between various components, opera-tions, and data stores are somewhat arbitrary, and particular operations are illustrated in the context of specific illustra-tive configurations. Other allocations of functionality are envisioned and may fall within the scope of the disclosure. In general, structures and functionality presented as separate components in the example configurations may be imple-mented as a combined structure or component. Similarly, structures and functionality presented as a single component may be implemented as separate components. These and other variations, modifications, additions, and improve-ments may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Furthermore, unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orien-tation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Example Embodiments

Example Embodiments can include the following:

Embodiments #1: A method for performing a seismic survey of a subsurface formation, comprising: emitting a plurality of source seismic signals from a plurality of seismic sources coupled to a wellbore of a well system; detecting, by a plurality of seismic sensors coupled to the wellbore of the well system, seismic signals associated with the plurality of source seismic signals, the detected seismic signals being at least one of reflected seismic signals or refracted seismic signals; and performing a seismic charac-terization of the subsurface formation based on analysis of the detected seismic signals and the plurality of source seismic signals.

Embodiments #2: The method of Embodiments #1, fur-ther comprising: determining whether to perform one or more well system operations on the wellbore based on the seismic characterization of the subsurface formation.

Embodiments #3: The method of Embodiments #1, wherein performing the seismic characterization of the sub-surface formation based on the analysis of the detected seismic signals and the plurality of source seismic signals includes: detecting a change in a fluid front of the subsurface formation based on the seismic characterization of the subsurface formation.

Embodiments #4: The method of Embodiments #3, wherein detecting the change in the fluid front of the subsurface formation based on the seismic characterization of the subsurface formation includes: performing a baseline seismic characterization of the subsurface formation; per-forming one or more additional seismic characterizations of the subsurface formation; and detecting the change in the fluid front of the subsurface formation based on a compari-son of the baseline seismic characterization and the one or more additional seismic characterizations.

Embodiments #5: The method of Embodiments #1, wherein performing the seismic characterization of the sub-surface formation based on the analysis of the detected seismic signals and the plurality of source seismic signals includes: generating a baseline seismic image of the sub-surface formation including a fluid front of the subsurface formation based on a baseline seismic characterization of the subsurface formation; generating one or more additional seismic images of the subsurface formation including the fluid front of the subsurface formation based on one or more additional seismic characterizations of the subsurface for-mation; and detecting a change in the fluid front of the subsurface formation based on a comparison of the baseline seismic image and the one or more additional seismic images of the subsurface formation.

Embodiments #6: The method of Embodiments #1, fur-ther comprising: controlling inflow control devices that control fluid flow in a plurality of zones of the wellbore based on the seismic characterization of the subsurface formation.

Embodiments #7: The method of Embodiments #1, fur-ther comprising: detecting a change in a fluid front of the subsurface formation based on the seismic characterization of the subsurface formation; and controlling inflow control devices that control fluid flow in a plurality of zones of the wellbore prior to the fluid front making contact with the wellbore in response to detecting the change in the fluid front of the subsurface formation.

Embodiments #8: The method of Embodiments #7, further comprising: determining that the change in the fluid front of the substrate formation is a fluid front change that affects a first zone of the plurality of zones of the wellbore; determining the change in the fluid front is greater than a threshold; and controlling the inflow control devices that control the fluid flow in the first zone and in one or more additional zones of the wellbore in response to determining the change in the fluid front is greater than the threshold.

Embodiments #9: The method of Embodiments #8, wherein: controlling the inflow control devices that control the fluid flow in the first zone includes one of turning off the fluid flow, reducing the fluid flow, or throttling the fluid flow in the first zone prior to the fluid front of the substrate formation contacting the wellbore, and controlling the inflow control devices that control the fluid flow in the one or more additional zones includes increasing the fluid flow in the one or more additional zones prior to the fluid front of the substrate formation contacting the wellbore.

Embodiments #10: A well system for performing a seismic survey of a subsurface formation, comprising: a plurality of seismic sources coupled to a wellbore of the well system, the plurality of seismic sources configured to emit a plurality of source seismic signals; a plurality of seismic sensors coupled to the wellbore of the well system, the plurality of seismic sensors configured to detect seismic signals associated with the plurality of source seismic signals, the detected seismic signals being at least one of reflected seismic signals or refracted seismic signals; and a data processing system configured to perform a seismic characterization of the subsurface formation based on analysis of the detected seismic signals and the plurality of source seismic signals.

Embodiments #11: The well system of Embodiments #10, wherein the data processing system is further configured to: determine whether to perform one or more well system operations on the wellbore based on the seismic characterization of the subsurface formation.

Embodiments #12: The well system of Embodiments #10, wherein the data processing system configured to perform the seismic characterization of the subsurface formation based on the analysis of the detected seismic signals and the plurality of source seismic signals includes the data processing system configured to: detect a change in a fluid front of the subsurface formation based on the seismic characterization of the subsurface formation.

Embodiments #13: The well system of Embodiments #12, wherein the data processing system configured to detect the change in the fluid front of the subsurface formation based on the seismic characterization of the subsurface formation includes the data processing system configured to: perform a baseline seismic characterization of the subsurface formation; perform one or more additional seismic characterizations of the subsurface formation; and detect the change in the fluid front of the subsurface formation based on a comparison of the baseline seismic characterization and the one or more additional seismic characterizations.

Embodiments #14: The well system of Embodiments #10, wherein the data processing system configured to perform the seismic characterization of the subsurface formation based on the analysis of the detected seismic signals and the plurality of source seismic signals includes the data processing system configured to: generate a baseline seismic image of the subsurface formation including a fluid front of the subsurface formation based on a baseline seismic characterization of the subsurface formation; generate one or more additional seismic images of the subsurface formation including the fluid front of the subsurface formation based on one or more additional seismic characterizations of the subsurface formation; and detect a change in the fluid front of the subsurface formation based on a comparison of the baseline seismic image and the one or more additional seismic images of the subsurface formation.

Embodiments #15: The well system of Embodiments #10, wherein the data processing system is further configured to: control inflow control devices that control fluid flow in a plurality of zones of the wellbore based on the seismic characterization of the subsurface formation.

Embodiments #16: The well system of Embodiments #10, wherein the data processing system is further configured to: detect a change in a fluid front of the subsurface formation based on the seismic characterization of the subsurface formation; and control inflow control devices that control fluid flow in a plurality of zones of the wellbore prior to the fluid front making contact with the wellbore in response to detecting the change in the fluid front of the subsurface formation.

Embodiments #17: The well system of Embodiments #16, wherein the data processing system is further configured to: determine that the change in the fluid front of the substrate formation is a fluid front change that affects a first zone of the plurality of zones of the wellbore; determine the change in the fluid front is greater than a threshold; and control the inflow control devices that control the fluid flow in the first zone and in one or more additional zones of the wellbore in response to determining the change in the fluid front is greater than the threshold.

Embodiments #18: The well system of Embodiments #10, wherein the plurality of seismic sources and the plurality of seismic sensors are coupled downhole to a horizontal portion of the wellbore of the well system.

Embodiments #19: A method for performing a seismic survey of a subsurface formation, comprising: emitting a plurality of source seismic signals from a plurality of seismic sources coupled to a wellbore of a well system; detecting, by a plurality of seismic sensors coupled to the wellbore of the well system, seismic signals associated with the plurality of source seismic signals, the detected seismic signals being at least one of reflected seismic signals or refracted seismic signals; performing a seismic characterization of the subsurface formation based on analysis of the detected seismic signals and the plurality of source seismic signals; detecting a change in a fluid front of the subsurface formation based on the seismic characterization of the subsurface formation; and controlling inflow control devices that control fluid flow in a plurality of zones of the wellbore in response to detecting the change in the fluid front of the subsurface formation.

Embodiments #20: The method of Embodiments #19, further comprising: determining that the change in the fluid front of the substrate formation is a fluid front change that affects a first zone of the plurality of zones of the wellbore; determining the change in the fluid front is greater than a threshold; and controlling the inflow control devices that control the fluid flow in the first zone and in one or more additional zones of the wellbore in response to determining the change in the fluid front is greater than the threshold.

What is claimed is:

1. A method for performing a seismic survey of a subsurface formation, comprising:

emitting a plurality of source seismic signals from a plurality of seismic sources coupled to a wellbore of a well system;

detecting, by a plurality of seismic sensors coupled to the wellbore of the well system, seismic signals associated with the plurality of source seismic signals, the detected seismic signals being at least one of reflected seismic signals or refracted seismic signals;

performing a seismic characterization of the subsurface formation based on analysis of the detected seismic signals and the plurality of source seismic signals;

determining a change in a fluid front of the subsurface formation is greater than a threshold based on the seismic characterization of the subsurface formation; and controlling inflow control devices that control fluid flow in a plurality of zones of the wellbore in response to determining the change in the fluid front is greater than the threshold.

2. The method of claim 1, further comprising:

determining whether to perform one or more well system operations on the wellbore based on the seismic characterization of the subsurface formation.

3. The method of claim 1, wherein performing the seismic characterization of the subsurface formation based on the analysis of the detected seismic signals and the plurality of source seismic signals includes:

detecting the change in the fluid front of the subsurface formation based on the seismic characterization of the subsurface formation.

4. The method of claim 3, wherein detecting the change in the fluid front of the subsurface formation based on the seismic characterization of the subsurface formation includes:

performing a baseline seismic characterization of the subsurface formation;

performing one or more additional seismic characterizations of the subsurface formation; and detecting the change in the fluid front of the subsurface formation based on a comparison of the baseline seismic characterization and the one or more additional seismic characterizations.

5. The method of claim 1, wherein performing the seismic characterization of the subsurface formation based on the analysis of the detected seismic signals and the plurality of source seismic signals includes:

generating a baseline seismic image of the subsurface formation including the fluid front of the subsurface formation based on a baseline seismic characterization of the subsurface formation;

generating one or more additional seismic images of the subsurface formation including the fluid front of the subsurface formation based on one or more additional seismic characterizations of the subsurface formation; and detecting the change in the fluid front of the subsurface formation based on a comparison of the baseline seismic image and the one or more additional seismic images of the subsurface formation.

6. The method of claim 1, wherein controlling the inflow control devices that control the fluid flow in the plurality of zones of the wellbore includes controlling the inflow control devices that control the fluid flow in the plurality of zones of the wellbore prior to the fluid front making contact with the wellbore.

7. The method of claim 1, further comprising:

determining that the change in the fluid front of the subsurface formation is a fluid front change that affects a first zone of the plurality of zones of the wellbore; and controlling the inflow control devices that control the fluid flow in the first zone and in one or more additional zones of the wellbore in response to determining the change in the fluid front is greater than the threshold.

8. The method of claim 7, wherein:

controlling the inflow control devices that control the fluid flow in the first zone includes one of turning off the fluid flow, reducing the fluid flow, or throttling the fluid flow in the first zone prior to the fluid front of the subsurface formation contacting the wellbore, and controlling the inflow control devices that control the fluid flow in the one or more additional zones includes increasing the fluid flow in the one or more additional zones prior to the fluid front of the subsurface formation contacting the wellbore.

9. A well system for performing a seismic survey of a subsurface formation, comprising:

a plurality of seismic sources to be coupled to a wellbore of the well system, the plurality of seismic sources configured to emit a plurality of source seismic signals;

a plurality of seismic sensors to be coupled to the wellbore of the well system, the plurality of seismic sensors configured to detect seismic signals associated with the plurality of source seismic signals, the detected seismic signals being at least one of reflected seismic signals or refracted seismic signals; and a data processing system configured to;

perform a seismic characterization of the subsurface formation based on analysis of the detected seismic signals and the plurality of source seismic signals, determine a change in a fluid front of the subsurface formation is greater than a threshold based on the seismic characterization of the subsurface formation, and control inflow control devices that control fluid flow in a plurality of zones of the wellbore in response to determining the change in the fluid front is greater than the threshold.

10. The well system of claim 9, wherein the data processing system is further configured to:

determine whether to perform one or more well system operations on the wellbore based on the seismic characterization of the subsurface formation.

11. The well system of claim 9, wherein the data processing system configured to perform the seismic characterization of the subsurface formation based on the analysis of the detected seismic signals and the plurality of source seismic signals includes the data processing system configured to:

detect the change in the fluid front of the subsurface formation based on the seismic characterization of the subsurface formation.

12. The well system of claim 11, wherein the data processing system configured to detect the change in the fluid front of the subsurface formation based on the seismic characterization of the subsurface formation includes the data processing system configured to:

perform a baseline seismic characterization of the subsurface formation;

perform one or more additional seismic characterizations of the subsurface formation; and 17
18 detect the change in the fluid front of the subsurface formation based on a comparison of the baseline seismic characterization and the one or more additional seismic characterizations.

13. The well system of claim 9, wherein the data processing system configured to perform the seismic characterization of the subsurface formation based on the analysis of the detected seismic signals and the plurality of source seismic signals includes the data processing system configured to:

generate a baseline seismic image of the subsurface formation including the fluid front of the subsurface formation based on a baseline seismic characterization of the subsurface formation;

generate one or more additional seismic images of the subsurface formation including the fluid front of the subsurface formation based on one or more additional seismic characterizations of the subsurface formation; and detect the change in the fluid front of the subsurface formation based on a comparison of the baseline seismic image and the one or more additional seismic images of the subsurface formation.

14. The well system of claim 9, wherein the data processing system configured to control the inflow control devices that control the fluid flow in the plurality of zones of the wellbore includes the data processing system configured to control the inflow control devices that control the fluid flow in the plurality of zones of the wellbore prior to the fluid front making contact with the wellbore.

15. The well system of claim 9, wherein the data processing system is further configured to:

determine that the change in the fluid front of the subsurface formation is a fluid front change that affects a first zone of the plurality of zones of the wellbore; and control the inflow control devices that control the fluid flow in the first zone and in one or more additional zones of the wellbore in response to determining the change in the fluid front is greater than the threshold.

16. The well system of claim 9, wherein the plurality of seismic sources and the plurality of seismic sensors are coupled downhole to a horizontal portion of the wellbore of the well system.

17. A method for performing a seismic survey of a subsurface formation, comprising:

emitting a plurality of source seismic signals from a plurality of seismic sources coupled to a wellbore of a well system;

detecting, by a plurality of seismic sensors coupled to the wellbore of the well system, seismic signals associated with the plurality of source seismic signals, the detected seismic signals being at least one of reflected seismic signals or refracted seismic signals;

performing a seismic characterization of the subsurface formation based on analysis of the detected seismic signals and the plurality of source seismic signals;

detecting a change in a fluid front of the subsurface formation based on the seismic characterization of the subsurface formation;

determining that the change in the fluid front of the subsurface formation is a fluid front change that affects at least a first zone of the plurality of zones of the wellbore;

determining the change in the fluid front is greater than a threshold; and controlling inflow control devices that control fluid flow in the first zone and in one or more additional zones of the wellbore in response to determining the change in the fluid front is greater than the threshold.

* * * * *